May 26, 1970  J. H. STEES  3,513,723
DIFFERENTIAL WITH LOCKING SPIDER GEARS
Filed June 7, 1968  3 Sheets-Sheet 2

Joseph H. Stees
INVENTOR.

BY *Clarence A. O'Brien*
*and Harvey B. Jacobson*
Attorneys

May 26, 1970 J. H. STEES 3,513,723
DIFFERENTIAL WITH LOCKING SPIDER GEARS
Filed June 7, 1968 3 Sheets-Sheet 3

Joseph H. Stees
INVENTOR.

BY *Clarence A. O'Brien*
*and Harvey B. Jacobson*
Attorneys

United States Patent Office 3,513,723
Patented May 26, 1970

3,513,723
DIFFERENTIAL WITH LOCKING SPIDER GEARS
Joseph H. Stees, R.R. 4, Freeport, Ill. 61032
Filed June 7, 1968, Ser. No. 735,307
Int. Cl. Int. Cl. F16h *1/44*
U.S. Cl. 74—711
9 Claims

ABSTRACT OF THE DISCLOSURE

A differential carrier assembly including a carrier body adapted to be journaled in an axle housing for rotation about an axis coinciding with the axes of rotation of attendant axle shafts, the assembly including the usual ring gear and meshed spider and axle gears in addition to a lock portion disposed between and engageable by the adjacent end faces of the spider gears in response to tendency of the spider gears to swing about the aforementioned axis to cause the spider gears to be wedged between the lock portion and the carrier body and thereby frictionally retard the spider gears relative to the carrier body.

---

The differential assembly of the instant invention is basically of conventional design but includes a lock assembly and semi-floating or full floating spider gears cooperable with the lock assembly and carrier body to frictionally retard the rotation of the spider gears relative to the carrier body as the semi-floating or full floating spider gears tend to swing about the axis of rotation of the carrier body in response to unequal rotation of the associated axle gears. Frictionally braking the spider gears against rotation relative to the carrier body will of course have the effect of locking the carrier body and thus cause the axle gears to rotate with the carrier body and therefore at the same rotational speed.

The main object of this invention is to provide a differential assembly including locking spider gears which may be automatically braked against rotation relative to the associated carrier body in response to angular displacement of the associated spider gears about the axis of rotation of the carrier body due to a tendency of one axle gear to rotate at a speed slower than the rotational speed of the other axle gear.

Another object of this invention is to provide a differential with locking spider gears in accordance with the immediately preceding object and which utilizes many of the basic components (some of which are modified) of a conventional differential assembly.

A final object of this invention to be specifically enumerated herein is to provide a differential assembly in accordance with the preceding objects which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a further sectional view like FIG. 2 but illustrating only the central portion thereof and with the spider gear slightly angularly displaced about the axle shaft rotational axis of the differential assembly so as to wedge the spider gears between the lock assembly and the carrier body;

FIG. 4 is a perspective view of the removable lock body of the instant invention;

FIG. 5 is a side elevational view of one of the modified semi-floating spider gears of the instant invention;

Figure 10:
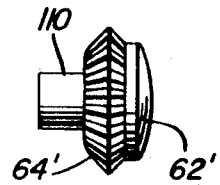
Figure 7:
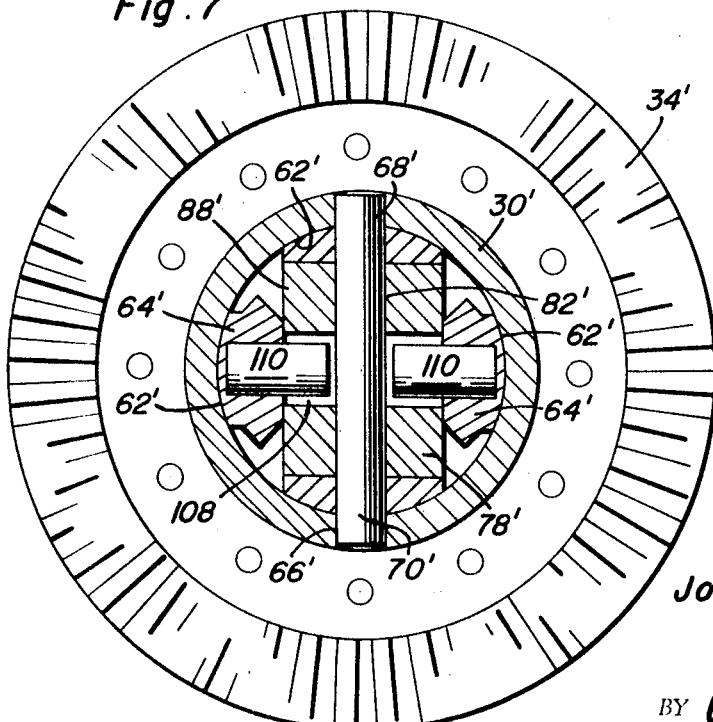
FIG. 7 is a sectional view taken substantially upon the plane indicated by the section line 7—7 of FIG. 6.
Figure 6:
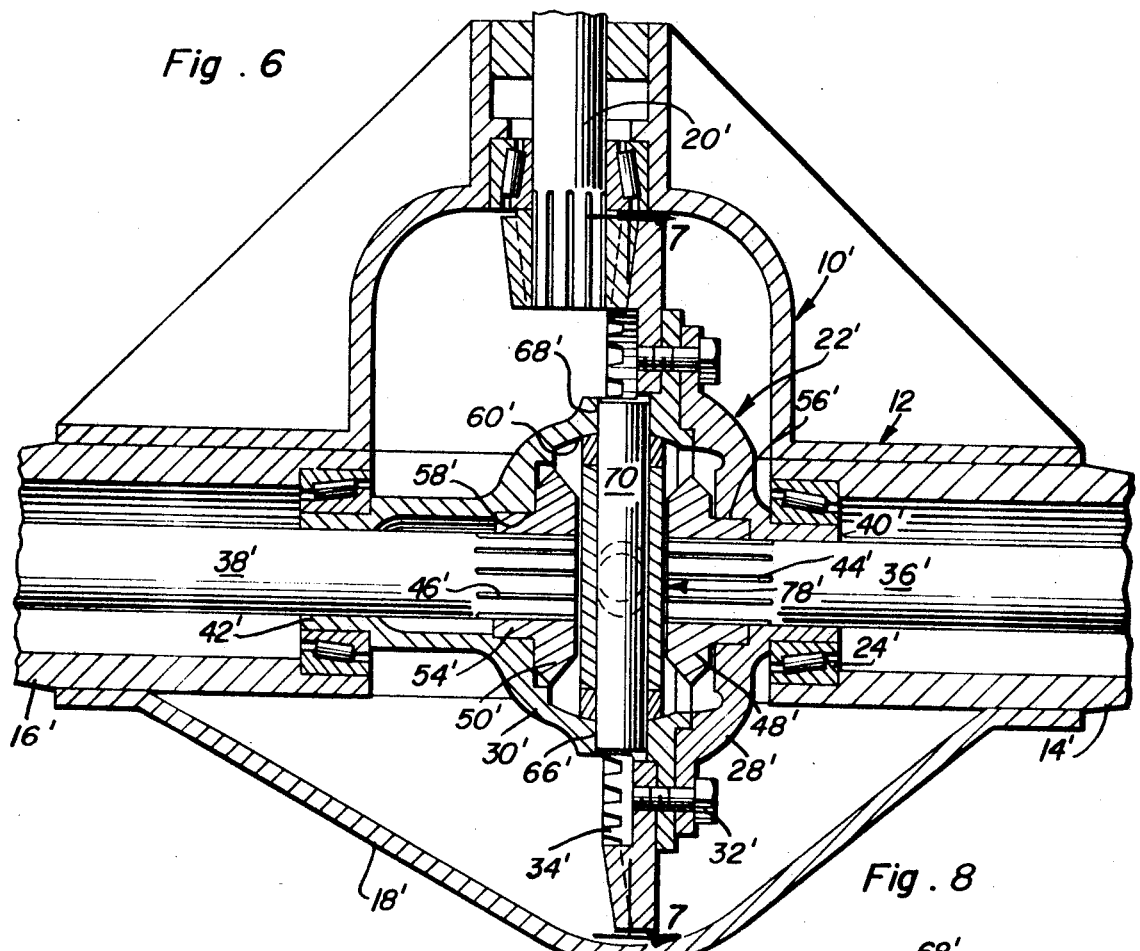
FIG. 6 is a sectional view similar to FIG. 1 but illustrating a second embodiment of the differential assembly.
Figure 9:
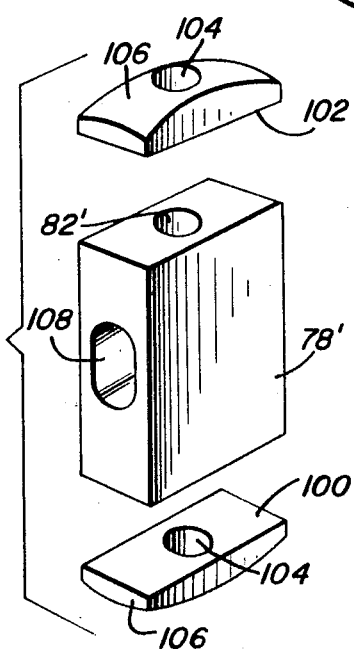
Figure 8:
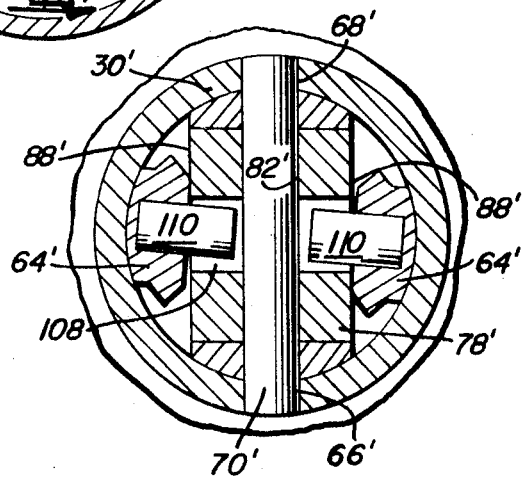

FIG. 8 is a further sectional view like FIG. 7 but illustrating only the central portion thereof and with the spider gears slightly angularly displaced about the axle shaft rotational axis of the differential assembly so as to frictionally wedge the spider gears between the lock body and differential body and thereby frictionally brake the spider gears against rotation relative to the differential carrier body which in turn also brakes the attendant axle gears against rotation relative to the carrier body so that the axle gears will rotate in unison with the carrier body;

FIG. 9 is an exploded perspective view of the lock assembly of the second embodiment of the invention; and FIG. 10 is a side elevational view of one of the floating spider gears of the second embodiment of the invention.

Referring now more specifically to the drawings, the numeral 10 generally designates a first embodiment of the differential assembly of the instant invention. The assembly 10 includes the usual case which is referred to in general by the reference numeral 12 and into which the adjacent ends of a pair of aligned axle housing halves 14 and 16 extend. The axle housing halves 14 and 16 are of course rigidly secured to the case 12 and the latter includes a removable rear cover 18.

A pinion gear 20 is journaled through the forward portion of the housing 12 and the differential assembly 10 includes a carrier body referred to in general by the reference numeral 22 and journaled in the adjacent ends of the axle housing halves 14 and 16 by means of bearing assemblies 24 and 26. The carrier body 22 includes first and second body sections 28 and 30 which are removably secured together by means of suitable fasteners 32 also utilized to secure a ring gear 34 to the carrier body section 30. The pinion gear 20 is meshed with and drives the ring gear 34 and a pair of axle shafts 36 and 38 extend through the axle housing halves 14 and 16 and have their adjacent inner ends journaled through the neck portions 40 and 42 of the carrier body sections 28 and 30 by which the carrier body 22 is journaled from the bearing assemblies 24 and 26. The adjacent end portions of the axle shafts 36 and 38 are splined as at 44 and 46 and a pair of splined axle gears 48 and 50 are disposed on the splined adjacent end portions of the axle shafts 36 and 38. The axle gears 48 and 50 include cylindrical portions 52 and 54 which are journaled in corresponding cylindrical recesses 56 and 58 formed in the carrier body sections 28 and 30 and the carrier body section 30 includes partial spherical surfaces 60 against which the partial spherical ends 62 of a pair of spider gears 64 are rotatably disposed. The spider gears 64 are meshed with the axle gears 48 and 50 and are free to be angularly displaced about the axes of rotation of the axle shafts 36 and 38 relative to the carrier body section 30.

The carrier body section 30 is provided with a pair of aligned radial bores 66 and 68 which are elongated in directions generally paralleling the periphery of the ring gear 34 and which snugly receive therethrough the opposite end portions of a lock pin 70 extending through the carrier body 22 centrally intermediate the axle gears 48 and 50.

The carrier body section 30 has diametrically opposed pairs of circumferentially spaced and opposing shoulders 72 and 74 formed therein and opposing channels 76 are formed between the pairs of shoulders 72 and 74. The lock assembly of the instant invention is generally referred to by the reference numeral 78 and comprises a lock body which is elongated and includes a pair of opposite end outwardly projecting lug portions 80 which are snugly received in the channels 76. The body 78 has a transverse bore 82 formed therethrough whose opposite end portions are elongated in the plane containing the bore 82 and the lug portions 80. The locking pin 70 extends through the bore 82, the bores 84 formed through the spider gears 64, and the radial bores 66 and 68 formed in the carrier body section 30.

Figure 1:
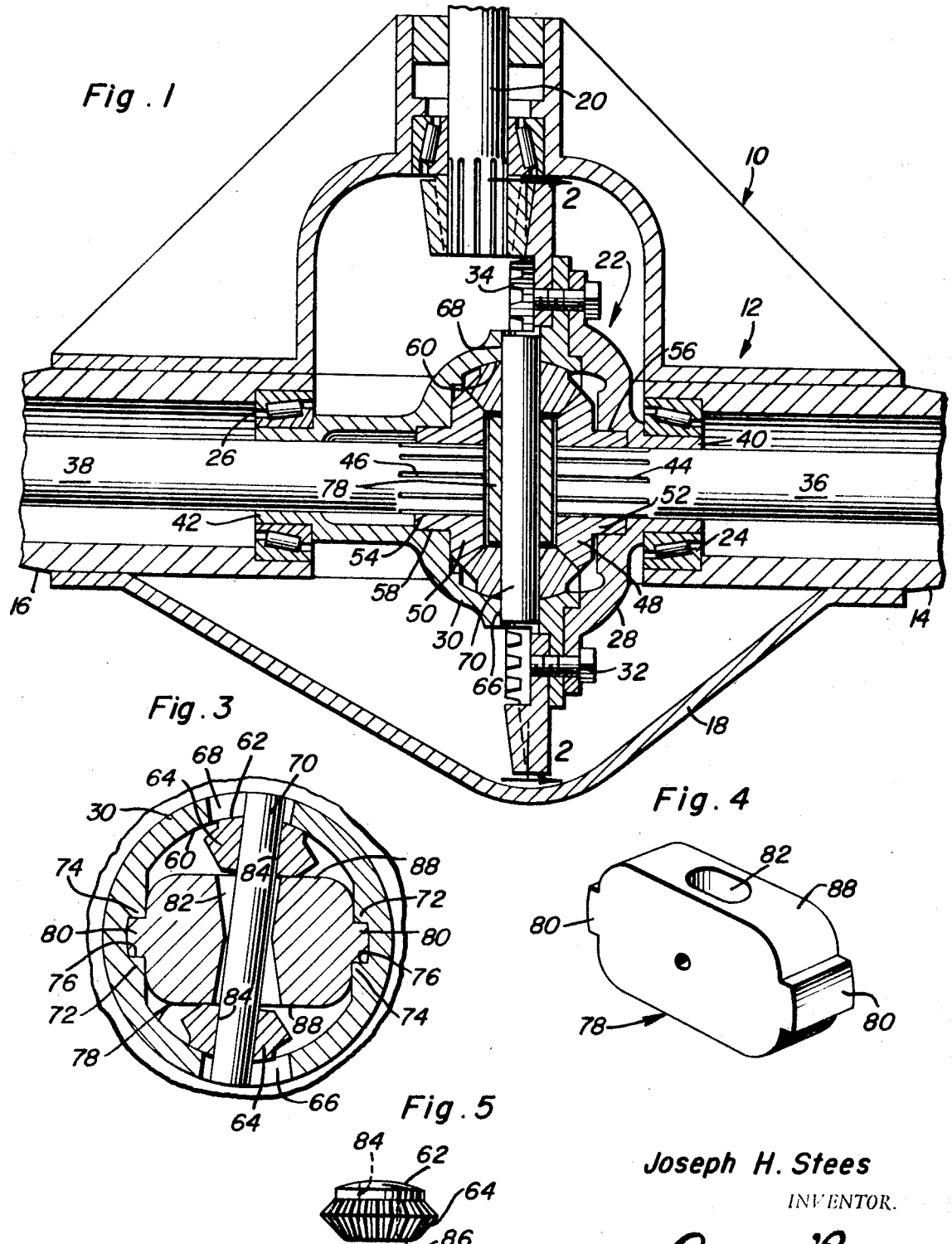
FIG. 1 is a cross-sectional view of a differential assembly embodying the present invention taken substantially upon a plane extending along the axle shaft axes of the assembly and containing the pinion shaft axis of the assembly.
Figure 2:
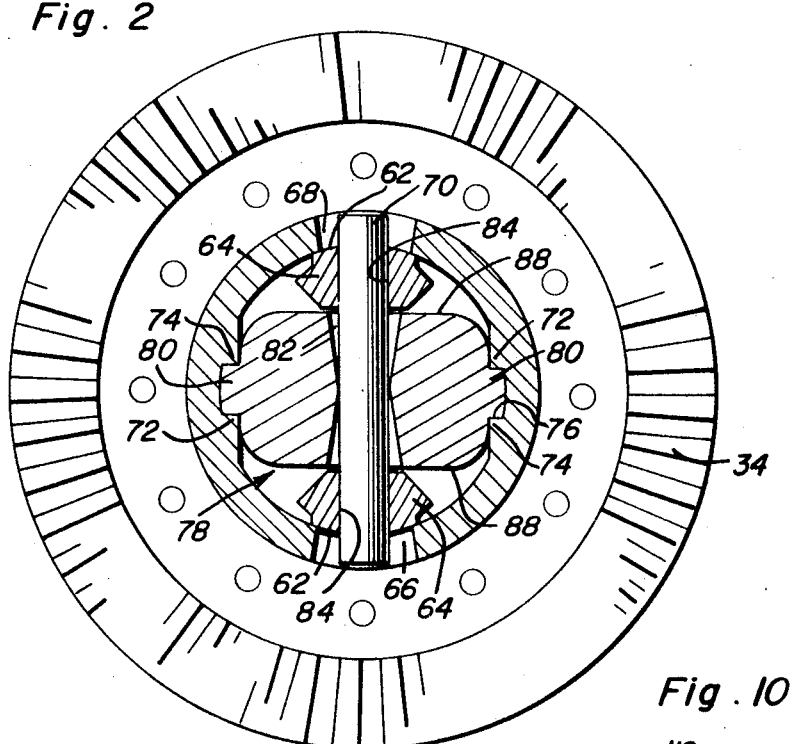
FIG. 2 is a sectional view taken substantially upon the plane indicated by the section line 2—2 of FIG. 1.

Of course, the spider gears 64 are meshed with the axle gears 48 and 50 and the partial spherical ends 62 of the spider gears 64 are rotatably engaged with the partial spherical surfaces 60 of the body section 30. It may thus be seen that the lock pin 70 may be oscillated between the positions thereof illustrated in FIGS. 2 and 3 of the drawings. From FIG. 2 of the drawings it may be seen that the spider gears 64 are free to shift slightly axially relative to the pin 70. However, when the pin 70 is angularly displaced so that its opposite end portions are disposed more to one set of ends of the bores 66 and 68, the spider gears 64 are cammed slightly inwardly by the partial spherical surfaces 60 so that their inner ends 86 frictionally engage the surfaces 88 through which the opposite ends of the bore 82 opens. Thus, any tendency of the pin 70 to shift from the position thereof illustrated in FIG. 2 of the drawings to the position thereof illustrated in FIG. 3 of the drawings will result in the spider gears 64 being frictionally braked against rotation relative to the body section 30 and the body of the lock assembly 78. In operation, as the pinion gear 20 drives the ring gear 34 the carrier body 22 tends to rotate and thereby drive the axle shafts 36 and 38 at the same speed. However, should one of the axle shafts 36 and 38 tend to rotate faster than the other axle shaft, the carrier body 22 will rotate in advance of the slower rotating axle shaft and thus cause the spider gears 64 and the locking pin 70 to be angularly displaced about the axes of rotation of the axle shafts 36 and 38 relative to the carrier body 22. When this occurs, the spider gears will be advanced toward the positions thereof illustrated in FIG. 3 of the drawings frictionally wedged between the partial spherical surfaces 60 and the surfaces 88 of the body of the lock assembly 78 whereby rotation of the spider gears 64 will be frictionally resisted and thus the axle gears 48 and 50 will be braked against rotation relative to the carrier body 22 so as to rotate in unison with the latter and at the same speed.

With attention now invited more specifically to FIGS. 7–10 of the drawings a second embodiment of the differential assembly is generally designated by the reference numeral 10' including a differential case 12', axle housing halves 14' and 16' as well as a removable rear cover 18' and a journaled pinion gear 20'.

The assembly 10' has a carrier body 22' journaled therein and many components of the assembly 10' are substantially identical to the assembly 10 and are therefore designated with corresponding prime numerals.

The assembly 10' differs from the assembly 10 in that the radial bores 66' and 68' are cylindrical and snugly receive the opposite ends of the lock pin 70' therethrough. Further, the bore 82' formed through the body or lock assembly 78' is cylindrical and the opposite ends of the lock assembly or body 78' include bearing blocks 100 and 102 which are abutted against the ends of the body 78' and have bores 104 formed therethrough which receive opposite end portions of the lock pin 70' therethrough. The bearing blocks 100 and 102 include remote partial spherical surfaces 106 which are abutted against the partial spherical surfaces 60' in the body section 30'. In addition, the lock assembly or body 78' has a transverse bore 108 formed therethrough which is elongated in a plane containing the bore 82' and the bore 108 and each of the spider gears 64' includes an inwardly projecting stub axle portion 110 which is rotatably received in the corresponding end of the transverse bore 108. The spider gears 64' include partial spherical end faces 62' which are rotatably engaged with the partial spherical surfaces 60' in the body section 30' and from a comparison of FIGS. 7 and 8 of the drawings it may be seen that the spider gears 64' and their stub axle portions 110 may be slightly angularly displaced about the axes of rotation of the axle shafts 36' and 38'. In operation, when one of the axle shafts 36' and 38' tends to lag behind the other, the semi-floating spider gears 64' tend to be angularly displaced from the positions thereof illustrated in FIG. 7 of the drawings to the positions thereof illustrated in FIG. 8 of the drawings thereby wedging the spider gears 64' between the partial spherical surface 60' and the opposite side surfaces 88' of the lock assembly or body 78' so as to frictionally retard rotation of the spider gears 64' relative to the body section 30'. Of course, frictional retarding of the spider gears 64' will also affect the axle gears 48' and 50' being frictionally braked against rotation relative to the carrier body 22' thus tending to cause the axle gears 48' and 50' to rotate in unison with the carrier body 22'.

It may therefore be understood that operation of the carrier body 22' is quite similar to operation of the carrier body 22 and that the spider gears 64' may be clamped against rotation relative to the carrier body 22' in generally the same manner in which the spider gears 64 may be clamped against rotation relative to the carrier body 22.

As a further modification, the spider gears 64' could be provided without the stub shafts 110 and the block or lock assembly 78' could be constructed without the transverse bore 108. In such a modification, the spider gears 64' would be of the full floating type but the operation of the differential assembly would be substantially identical to the operation of the differential assembly 10'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A locking differential comprising a housing, a case rotatable in said housing for rotation about an axis fixed relative to said housing, a first pair of gears rotatably mounted in said case for rotation about and spaced apart along said axis, a second pair of gears disposed in said case for rotation about generally aligned axes extending at generally right angles relative to said axis and for limited angular displacement of their axes of rotation in opposite directions from centered positions of said axes about said axis, said second pair of gears being spaced apart along said axes and meshed with corresponding generally diametrically opposite portions of said first pair of gears, and brake means supported in said case against rotation with said first pair of gears relative to said case, disposed between said first pair of gears and operatively associated with said second pair of gears for frictionally engaging and braking the latter against rotation relative to said case in response to angular shifting of said axes relative to said case about said axis in either direction from said centered positions.

2. The combination of claim 1 wherein said brake means includes a block stationarily supported in said case against rotation relative thereto about said axis, said case including peripherally extending partial spherical surface portions having a common center of curvature disposed on said axis centrally intermediate said first pair of gears, said second pair of gears including partial spherical remote surfaces conforming to and rotatably engaged with said partial surface portions, said second pair of gears being captively disposed between said partial spherical surface portions and adjacent remote surface portions of said block, said remote surface portions of said block including opposite end portions with which said partial spherical portions converge, whereby angular displacement of said axes about said axis will shift said second pair of gears into wedging frictional engagement with the corresponding remote surface end portions and thus tend to brake said second set of gears against rotation relative to said case and thus lock said first set of gears for rotation in unison with said case.

3. The combination of claim 2 wherein said block includes an opening formed therethrough, a pivot shaft extending through said opening and disposed normal to said axis, said pivot shaft being oscillatable relative to said block about said axis, said second set of gears being journaled on opposite end portions of said shaft, said shaft extending through said second pair of gears and including terminal end portions disposed outwardly of said second pair of gears, said case having elongated aligned openings formed therein at opposite ends of said shaft and in which said terminal end portions are guidingly received for swinging movement about said axis during oscillation of said shaft.

4. The combination of claim 3 wherein said opening through said block includes parallel opposite side surface portions paralleling the plane in which said shaft is oscillatable and which are guidingly engaged with the opposing surface portions of said shaft.

5. The combination of claim 4 wherein said openings formed in said case also include opposite side surfaces paralleling the plane in which said shaft is oscillatable and which are guidingly engaged with the opposing surface portions of said shaft.

6. The combination of claim 1 wherein said brake means includes a block stationarily supported in said case against rotation relative thereto about said axis, said case including peripherally extending partial spherical surface portions having a common center of curvature disposed on said axis centrally intermediate said first pair of gears, said second pair of gears including partial spherical remote surfaces conforming to and rotatably engaged with said partial surface portions, said second pair of gears being captively disposed between said partial spherical surface portions and adjacent remote surface portions of said block, said remote surface portions of said block including opposite end portions with which said partial spherical portions converge, whereby angular displacement of said axes about said axis will shift said second pair of gears into wedging frictional engagement with the corresponding remote surface end portions and thus tend to brake said second set of gears against rotation relative to said case and thus lock said axle gears for rotation in unison with said case, said block having an opening formed therethrough, a pivot shaft extending through said opening and disposed normal to said axis and said axes, said case including bores in which the opposite end portions of said shaft are received.

7. The combination of claim 6 wherein said block includes bores opening outwardly of said remote surface portions disposed at generally right angles relative to said shaft and axis, the last-mentioned bores being elongated in directions extending longitudinally of said shaft and including opposite side surface portions disposed normal said axes and said axis, said second pair of gears including stub axle portions projecting toward each other and into the last-mentioned bores with said opposite side surface portions guidingly engaged therewith.

8. The combination of claim 1 wherein said brake means includes a block stationarily supported in said case against rotation relative thereto about said axis, said case including peripherally extending partial spherical surface portions having a common center of curvature disposed on said axis centrally intermediate said first pair of gears, said second pair of gears including partial spherical remote surfaces conforming to and rotatably engaged with said partial surface portions, said second pair of gears being captively disposed between said partial spherical surface portions and adjacent remote surface portions of said block, said remote surface portions of said block including opposite end portions with which said partial spherical portions converge, whereby angular displacement of said axes about said axis will shift said second pair of gears into wedging frictional engagement with the corresponding remote surface end portions and thus tend to brake said second set of gears against rotation relative to said case and thus lock said axle gears for rotation in unison with said case, said block having an opening formed therethrough, a pivot shaft extending through said opening and disposed normal to said axis and said axes, said case including bores in which the opposite end portions of said shaft are received, wherein said block, at opposite ends of said bore, includes bearing blocks between which said block is disposed, through which the opposite end portions of said shaft are passed and including remote surfaces which are semi-spherical in configuration and disposed in bearing contact with said partial spherical surface portions of said case.

9. The combination of claim 8 wherein said block and said bearing blocks include opposing bearing surfaces disposed normal to said shaft.

References Cited

UNITED STATES PATENTS

| 2,769,353 | 11/1956 | Nash | 74—711 |
| 2,855,806 | 10/1958 | Fallon | 74—710.5 |
| 3,131,578 | 5/1964 | Elliott | 74—710.5 |
| 3,131,579 | 5/1964 | Elliott | 74—710.5 |

ARTHUR T. McKEON, Primary Examiner